United States Patent [19]

Thurm et al.

[11] 4,422,752

[45] Dec. 27, 1983

[54] METHOD OF AND AN APPARATUS FOR CLASSIFYING COLOR FILMS

[75] Inventors: Siegfried Thurm, Voiswinkel; Konrad Bunge, Cologne, both of Fed. Rep. of Germany

[73] Assignee: Agfa-Gevaert Aktiengesellschaft, Leverkusen, Fed. Rep. of Germany

[21] Appl. No.: 129,108

[22] Filed: Mar. 10, 1980

[30] Foreign Application Priority Data

Mar. 9, 1979 [DE] Fed. Rep. of Germany ....... 2909336

[51] Int. Cl.³ .............................................. G03B 27/52
[52] U.S. Cl. ......................................... 355/41; 355/32
[58] Field of Search ................................ 354/105–109; 250/226, 555, 557; 340/146.3 B; 235/465, 469; 355/38, 40, 41; 356/404

[56] References Cited

U.S. PATENT DOCUMENTS 3,835,297  9/1974  Inoue et al. ........................ 250/557
4,264,196  4/1981  von Stein .............................. 355/38

FOREIGN PATENT DOCUMENTS 2532600 11/1976 Fed. Rep. of Germany .
2803866  8/1978 Fed. Rep. of Germany ........ 355/38

Primary Examiner—F. L. Evans
Attorney, Agent, or Firm—Kontler, Grimes & Battersby

[57] ABSTRACT

An exposed color film having an exposed zone is provided with color areas prior to developing the same by exposing this unexposed zone to light passing through different narrow-band filters. After developing the film, the transmissivities of each of the color areas within a pair of narrow-band ranges is measured. The measured values are compared with known values for various types of film to establish the type of the particular color film. This information is used to adjust the exposures in the different colors when the images on the color film are copied onto a photographic copying material.

19 Claims, 3 Drawing Figures

METHOD OF AND AN APPARATUS FOR CLASSIFYING COLOR FILMS

BACKGROUND OF THE INVENTION

The present invention is generally concerned with a method of and an apparatus for classifying color films according to type. More particularly, the invention relates to a method and an apparatus for classifying color films which differ from one another in their response to exposure to radiation. In a more specific aspect, the invention is concerned with a method and an apparatus for use in selecting the amounts of radiation of different wavelength to which a color film is to be exposed during the production of copies therefrom.

In the course of copying color originals in automatic color printers or similar copying machines, it was heretofore customary to sort the films by manufacturer prior to copying, even if these color films could be developed by the same chemical process. This sorting is desirable, and may even be necessary, since optimum results during copying may require exposures differing considerably from those of the calibrating original used to object the color printer or similar copying machine. The coloring dyes of films stemming from different film manufacturers often exhibit, different spectral transmission characteristics after development. In order to be able to process films having different spectral characteristics using only one measuring arrangement having predetermined spectral properties, conventional printer are designed to convert the measured values into values which correspond to the spectral characteristics responses of the particular color film being used. This is usually achieved by adjusting each color channel of the photoelectric exposure control arrangement by means of adjustable or replaceable resistors known as slope storage units. In this manner, the measured values are adjusted to the particular type of film from which copies are to be made so that optimum results are achieved.

When it is desired to produce copies from color films at high speed, the color films are joined at their ends to form a strip which is wound onto a roller or reel. In order to obtain optimum copies under these circumstances, it was previously necessary for all of the films in any strip to be of the same type. This, of course, required classification of the films by type prior to copying and the production of a separate strip for each type of film even though the same chemical process was used for developing the different types of film. Such classification constitutes an additional step in the processing of the films and results in certain difficulties, particularly as regards organization of the processing operation as well as increased labor costs.

OBJECTS AND SUMMARY OF THE INVENTION

Accordingly, it is a general object of the present invention to avoid the disadvantages of the prior art.

More particularly, it is an object of the present invention to provide an improved method which enables color films according to type and is especially well-suited for use in selecting the amounts of radiation of different wavelength to which a color film is to be exposed during the production of copies therefrom.

Yet another object of the present invention is to develop an improved classifying method which renders it possible to group color films having the same response to exposure to radiation.

A concomitant object of the present invention is to provide an apparatus which is capable of performing the classifying method of the present invention.

An additional object of the present invention is to design the apparatus so as to be simple in construction, easy to use and reliable in operation nevertheless.

Furthermore, it is an object of the invention to avoid the need for pre-classifying color films according to manufacturer or type in advance of the copying operation.

In pursuance of these objects and others which will become apparent hereafter, one feature of the present invention resides in a method of classifying color films which differ from one another in their response to exposure to radiation. The method is particularly well suited for use in selecting the amounts of radiation of different wavelength to which a color film is to be exposed during the production of copies therefrom. The method comprises the steps of providing markings of a predetermined color composition on an unexposed zone of the color film and exposing the unexposed zone to radiation prior to developing the color film. The spectral transmissivity values for the markings are determined subsequent to development of the color film; and compared with standard transmissivity values of the various types of color films.

In the following discussion, the present invention will be explained with reference to the classification of color films having individual layers which are sensitive to blue, green and red light. However, it is to be understood that this is only an exemplary use of the method and apparatus of the present invention. In this particular application of the basic concept of the present invention, it is advantageous for the markings to be produced by copying a plurality of color filters onto the unexposed zone of the color film. The filters are so chosen that their transmission maximum are situated in a regions of a high spectral sensitivity of the individual layers. This results in a situation wherein essentially only one coloring dye is developed in the copies of the color filters (such copies will hereafter be referred to as color areas). The transmissivities of these color areas are measured by resorting to a plurality of different narrow-band color filters. Different transmissivity values are then obtained for coloring dyes having different spectral transmission characteristics.

Particularly advantageous results are obtained when the filters used for production of the markings are narrow-band interference filters which have respective transmissivity maxima at wavelengths of 450 nm, 550 nm and 650 nm. These wavelengths respectively correspond to the yellow, purple and blue-green colors of the spectrum. Under these circumstances, it is especially favorable to use two narrow-band color filters for each of the yellow, purple and blue-green color areas during the transmissivity determinations. Filters which transmit radiation of the following wavelengths are particularly advantageous: 400 and 450 nm for the yellow color areas; 520 and 550 nm for the purple color areas; and 650 and 700 nm for the blue-green color areas. The amount of radiation passing through the narrow-band filters during the production of the marking is preferably so selected that the densities of the markings exceed the density of the unexposed film by a factor of at least 1.2. The markings may be provided at the ends or at the longitudinal margins of the color films, that is, next to and/or between the perforations in the films.

The novel features which are considered as characteristic of the invention are set forth in particular in the appended claims. However, the improved method of and apparatus for classifying color films, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 2:
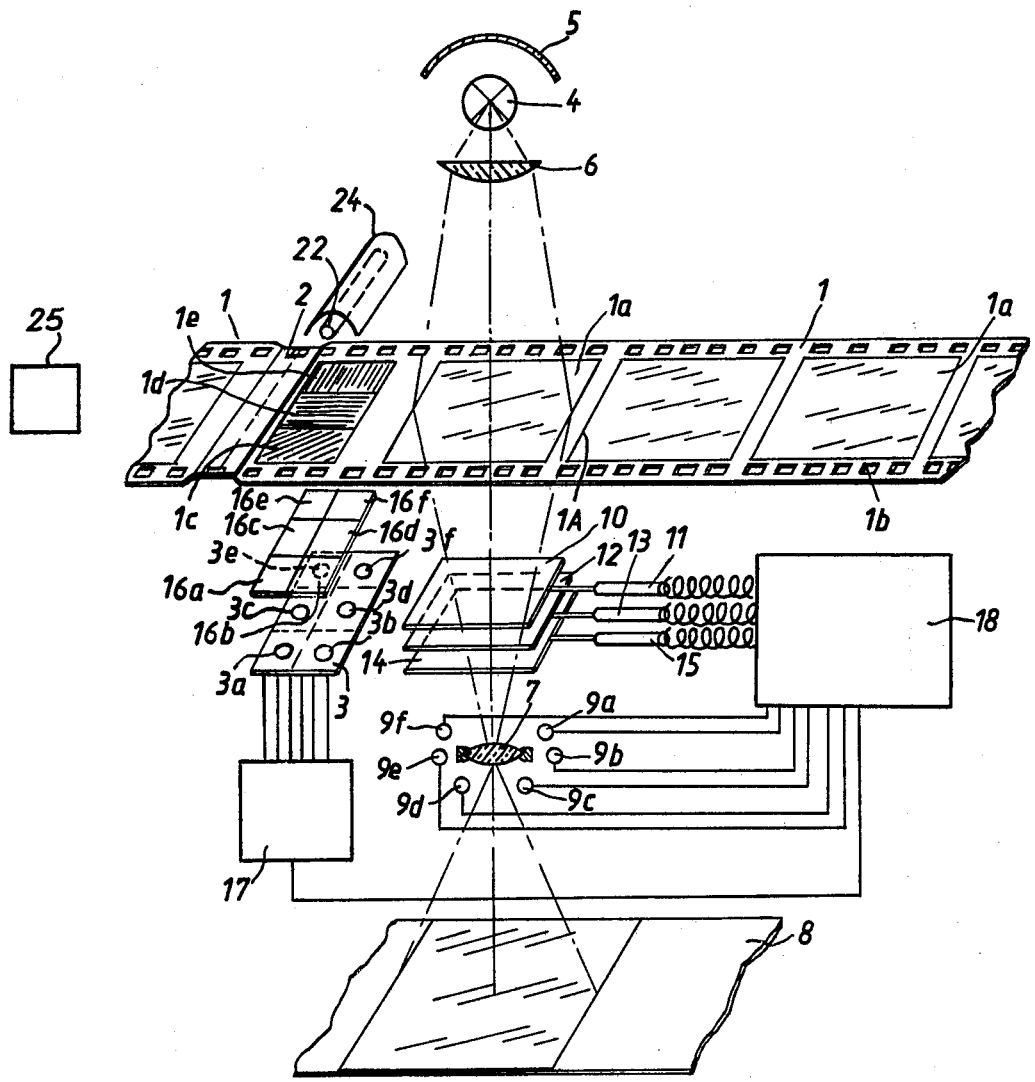
FIG. 2 is a somewhat diagrammatic perspective view from an arrangement for copying from negative color films in accordance with markings provided thereon.

Referring now to the drawing in detail, and first to FIG. 2 thereof, it may be seen that the reference numeral 1 has been used to indicate a developed color film, e.g. a negative. The film 1 carries a series of images or frames 1a from which copies are to be made. The film 1 has perforations 1b at its longitudinal marginal portions as is customary and is joined to another color film 1 by an adhesive strip 2 or the like. The zone between the adhesive strip 2 and the first frame 1a (or, under certain circumstances, the last frame 1a as will be discussed later) is unexposed, that is, does not carry an image 1a. Prior to the development of the color film 1, markings or color areas 1c, 1d and 1e are provided on this unexposed zone of the film 1. The present invention will be discussed herein as used in connection to discriminate between various types of negative color films 1. However, it is to be understood that the principles of the present invention will be analogously used when the color film 1 is a positive color film such as is used for making color transparencies or slides.

When the film 1 is a negative color film, the color areas 1c, 1d and 1e are obtained by exposing the unexposed portion of the film 1 to radiation or light which passes through three narrow-band interference filters having their highest transmissivities at wavelengths of 450 nm, 550 nm and 650 nm. After the development of the color film 1, the areas 1c, 1d, and 1e are respectively yellow, purple and blue-green. The exposures for the color areas or markings 1c, 1d and 1e are such that, after development, the respective photographic densities of the yellow color area 1c at a wavelength of 450 nm, the purple color area 1d at a wavelength of 550 nm, and the blue-green color area 1e at a wavelength of 700 nm exceed the photographic density of unexposed film by a factor of at least 1.2. The photographic density is determined from the equation $D = \log(1/T)$, wherein T is the transparency of the film or the ratio of the intensity of light passing through the film to the intensity of light directed against the film.

FIG. 2 depicts a measuring station which includes the elements 22, 24, 16a–16f, 3 and 17. At this measuring station, the transmissivities of the individual color areas 1c, 1d and 1e are measured at the following pairs of wavelengths, respectively.

| Color Area | Wavelength (nm) |
| --- | --- |
| 1c (yellow) | 400; 450 |
| 1d (purple) | 520; 550 |
| 1e (blue-green) | 650; 700 |

Of course, it is not necessary that the areas 1c, 1d and 1e be arranged in the above sequence or that they adjoin each other transversely of the film 1 so long as they are in registry with the associated elements of the measuring station.

The relationships between the measured values for the colors areas 1c, 1d and 1e are indicative of the spectral properties or characteristic responses of the film 1 when exposed to light or radiation. The data obtained in this manner can be used to adjust the measuring arrangement of the copying apparatus which is shown in FIG. 2 and will be discussed in some detail later on. When the relationship between the measured values do not differ for different types of color film, the spectral transmissivities of the coloring dyes of such films differ insignificantly. Under these circumstances, different types of color film can be copied using the same adjustment of the measuring arrangement of the copying apparatus.

Figure 1:
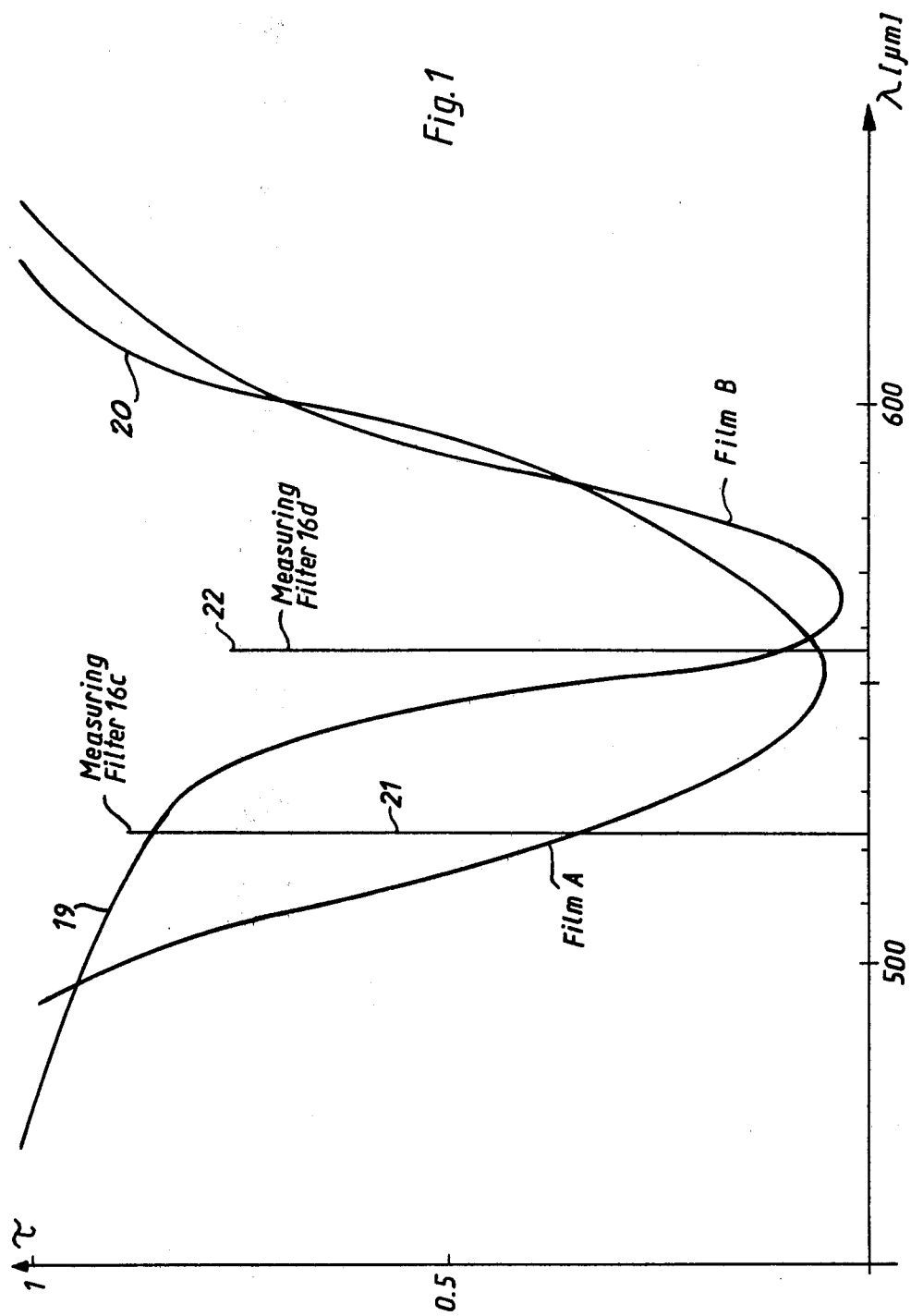
FIG. 1 is an exemplary graphical representation of the spectral transmissivities of the purple areas of two different types of negative color film.

FIG. 1 is an exemplary diagrammatic representation of the spectral transmissivity of the purple coloring dye of two different types of film. A curve 19 corresponds to one of these types while a curve 20 corresponds to the other type. The curves 19 and 20 represent variation in the absorption of the purple dye over a range of wavelength λ from 500 to 600 nm. Two lines 21 and 22 indicate the respective positions of the main permeability regions of two narrow-band measuring filters. The permeability regions are located at wavelengths of approximately 520 and 550 nm, respectively. It can be readily seen from the curves 19 and 20 that the permeabilities of the coloring dyes of the two types of film differ insignificantly at the line 22, while a considerable difference in permeability exists at the line 21. Hence, the relationship between the transparency values at the lines 21 and 22 for the dye having a characteristic response conforming to the curve 19 clearly differs from that for the dye having a characteristic response conforming to the curve 20. On the one hand, this explains why the measuring arrangement of a color printer or similar copying apparatus has to be adjusted to the transmissivities of the dyes in the originals. On the other hand, it explains why the relationship between the transparencies or transmissivities obtained with the two measuring filters renders it possible to identify the film as to its type. Returning now to FIG. 2 for a more detailed discussion of the components illustrated therein, it may be seen that it diagrammatically illustrates the important components of a copying apparatus. The apparatus is equipped with an arrangement for identifying or classifying the films 1 and for automatically adjusting the slope storage units in dependence upon the results of the film classifying procedure.

The film strip consisting of a succession of color films 1 joined by adhesive strips 2 and provided with the markings or color areas 1c, 1d and 1e at their leading portions (and/or at their trailing portions) in an apparatus 25 is advanced into and through a copying station. The copying station is similar to that described in out copending application Ser. No. 5,514 filed on Jan. 22, 1979, and the disclosure of this application is incorporated herein by reference, except as noted below. The copying apparatus includes a light source 4, a reflector 5 and a condenser lens 6 which together form an optical system which illuminates a frame or image 1a located at a copying position. The optical system also includes a lens 7 which images the frame 1a onto a corresponding area of a band 8 of appropriate copying material. Subtractive filters 10, 12 and 14, which are controlled by magnets 11, 13 and 15, respectively, are introduce into the path of the copying light. The magnets 11, 13 and 15 are energized and deenergized in accordance with commands originating in an exposure control arrangement 18. The latter can be identical or similar to that disclosed in the commonly owned U.S. Pat. No. 3,867,029 granted on Feb. 18, 1975, and the disclosure of the patent in this respect is incorporated herein by reference.

Photoelectric measuring arrangements which are sensitized for the individual colors and are preferably in the form of photoelectric diodes 9a-9f are arranged in the stray light region of the lens 7. The outputs of these photoelectric diodes 9a-9f are coupled to the individual color channels of the control arrangement 18. The control arrangement 18 also includes various storages or registers which store the values for adjusting the copying apparatus to different types of color films.

Next to the copying station, that is, upstream or downstream of the copying station, there is provided a sensing or testing arrangement for the color areas 1c, 1d and 1e. This sensing arrangement includes a rod-shaped light source 22 for uniformly illuminating the color areas 1c, 1d and 1e, as well as measuring elements 3a-3f arranged on the opposite side of the film 1 from the light source 22. The light source 22 is partially surrounded by a reflector 24. The measuring elements 3a-3f, which together constitute a measuring unit 3, are sensitized to different color by respective filter sections or elements 16a-16f. The filter sections 16a and 16b registering with the yellow color area 1c have their respective transmissivity maxima at wavelengths of 400 and 450 nm; the two filter sections 16c and 16d registering with the purple color area 1d have their transmissivity maxima at wavelengths of 420 and 550 nm; and the filter sections 16e and 16f registering with the blue-green color area 1e have their respective transmissivity maxima at wavelengths of 650 and 700 nm. Hence, the measuring arrangement 3a-3f measures the transmissivities of the color areas 1c-1e within the narrow-band ranges of the filter sections 16a-16f. These measured values, which are indicative of the absorption characteristics of the coloring dyes are transmitted to an evaluating arrangement 17. The latter compares the measured values with similar values for known types of film which are stored in the evaluating arrangement 17. On the basis of these comparisons, the evaluating arrangement 17 determines the type of film to which the color film 1 corresponds. The result is supplied to the exposure control arrangement 18 to activate the corresponding storage therein and adjust the copying apparatus appropriately.

Figure 3:
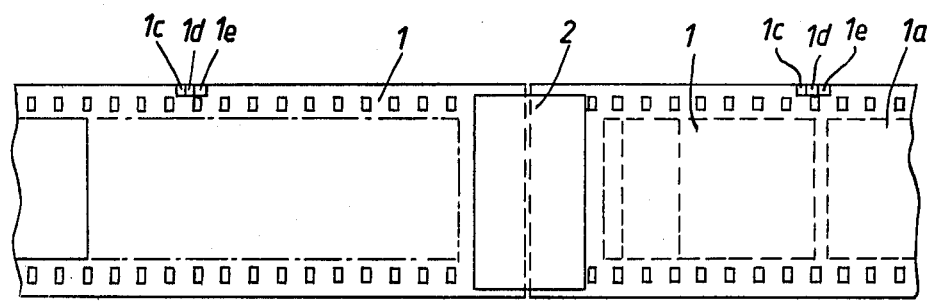
FIG. 3 is a top plan view of joined end portions of two different color films which are provided with markings at their longitudinal marginal portions.

In order to be able to identify or classify color film sections such as are obtained by subdividing the original color film 1, e.g. for the purpose of making reorder copies, it is possible to provide the color areas 1c, 1d and 1e at the longitudinal marginal portions of the film 1 as shown in FIG. 3. The markings or color areas 1c, 1d and 1e are then provided at spaced intervals along at one or both of the longitudinal marginal portions. In FIG. 3, the markings 1c, 1d and 1e are located outside of the area of the perforations 1b. However, they could also be provided between the perforations 1b, especially when using an apparatus such as that disclosed in the commonly owned copending patent application Ser. No. 5,515 filed on Jan. 22, 1979 in the name of Friedrich Hujer, and the disclosure of which is incorporated herein by reference. It is to be understood that the above discussion does not enumerate all of the possibilities for employing the method of the present invention. For instance, it is conceivable to employ the principles disclosed herein using more or less than three color areas. Of course, under these circumstances, the remaining parts of the measuring arrangement will have to be changed accordingly.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What we claim is:

1. A method of classifying a color film, particularly for use in adjusting the exposure of said film during the production of copies therefrom, comprising the steps of providing a marking of predetermined color composition on an unexposed zone of said film by exposing said zone to radiation prior to development and subsequently developing the latter; determining the spectral transmissivity of said marking; and comparing said transmissivity with reference transmissivities.

2. A method as defined in claim 1, wherein a plurality of markings having different predetermined color compositions are provided on said zone and the determining and comparing steps are peformed for each of said markings.

3. A method as defined in claim 2, wherein said film is highly sensitive to radiation of predetermined wavelengths and said zone is exposed predominantly to radiation having said predetermined wavelengths.

4. A method as defined in claim 3, wherein said wavelengths are in the regions of about 450 nm, 550 nm and 650 nm, respectively.

5. A method as defined in claim 2, wherein said markings are yellow, purple and blue-green, respectively.

6. A method as defined in claim 2, wherein said zone is located at an end of said film.

7. A method as defined in claim 2, wherein said zone is located at a marginal portion of said film.

8. A method as defined in claim 1, wherein exposure of said zone is controlled so that the density of said marking exceeds that of said film prior to exposure by a factor of at least 1.2.

9. A method as defined in claim 1, wherein the determining step comprises measuring said spectral transmissivity at a minimum of two wavelengths.

10. A method as defined in claim 9, wherein said wavelengths are in the regions of 400 and 450 nm for a first color composition, 520 and 550 nm for a second color composition, and 650 and 700 nm for a third color composition.

11. A method as defined in claim 1; further comprising the steps of evaluating the results of the comparing step; and classifying said film on the basis of the evaluating step.

12. A method as defined in claim 1, said film including a plurality of film sections; and further comprising the step of joining said sections, said marking being provided on said zone at the time of the joining step.

13. A method as defined in claim 1, wherein said marking is provided on said zone by exposing the latter to a light flash.

14. An arrangement for classifying a color film, particularly for use in adjusting the exposure of the film during the production of copies therefrom, comprising means for forming markings of predetermined color composition on the film; means for determining the spectral transmissivities of the markings; and means for comparing the spectral transmissivities of the markings with reference transmissivites.

15. An arrangement as defined in claim 14, wherein said forming means includes a source of radiation, and a plurality of color filters having respective maximum transmissivities in the regions of wavelengths to which the film is highly sensitive.

16. An arrangement as defined in claim 15, wherein said filters comprise narrow-band filters having respective maximum transmissivities at wavelengths in the regions of 450 nm, 550 nm and 650 nm, respectively.

17. An arrangement as defined in claim 14, wherein said determining means includes a source of radiation for illuminating the markings, filter means for filtering the radiation transmitted through the markings from said source, and detecting means for detecting the filtered radiation from the markings, said filter means including a pair of narrow-band filters arranged to filter the radiation transmitted through a respective marking and having respective transmissivity maxima in the regions of two different wavelengths.

18. An arrangement as defined in claim 17, said wavelengths being 400 and 450 nm; wherein said filter means includes two additional pairs of narrow-band filters which are respectively arranged to filter the radiation transmitted through two additional markings, the filters of one of said additional pairs having respective transmissivity maxima at wavelengths in the regions of 520 and 550 nm, and the filters of the other of said additional pairs having respective transmissivity maxima at wavelengths in the regions of 650 and 700 nm.

19. An arrangement as defined in claim 14; and further comprising means for evaluating the results from said comparing means and classifying the film.

* * * * *